Figure 1:
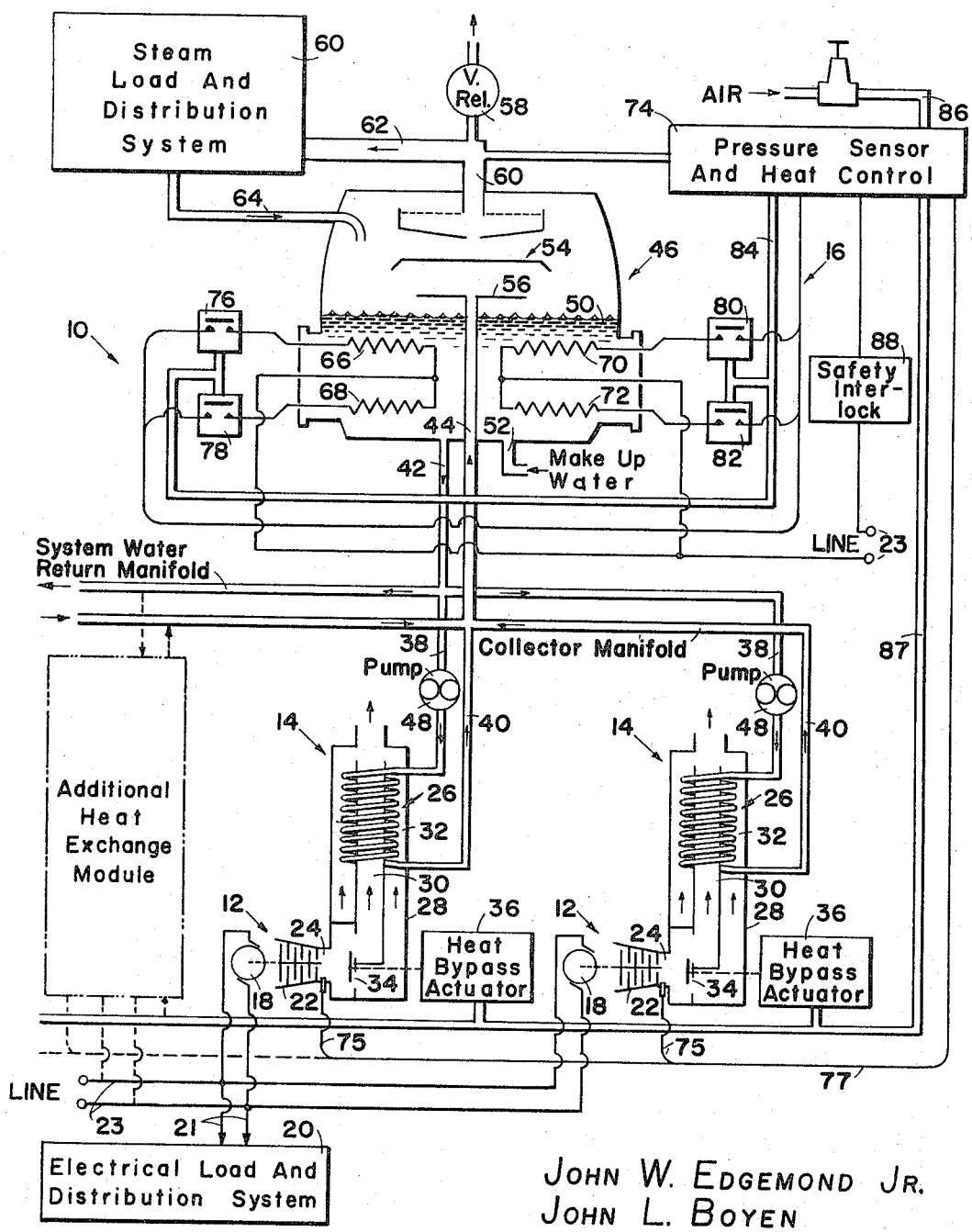

JOHN W. EDGEMOND JR.
JOHN L. BOYEN
INVENTORS.

BY

Townsend and Townsend

3,367,111
ENERGY RETRIEVAL SYSTEM

John W. Edgemond, Jr., Oakland, and John L. Boyen, Orinda, Calif., assignors, by mesne assignments, to Vapor Corporation, Chicago, Ill., a corporation of Delaware
Filed May 5, 1966, Ser. No. 548,002
14 Claims. (Cl. 60—105)

This invention relates to energy conversion systems of the type suitable for use in satisfying the relatively high volume power demands of commercial and industrial installations and, more particularly, to such a system which employs heat recovery apparatus to provide optimum energy retrieval from the hot, pressurized exhaust gases of a group of turbine-generator assemblies.

Briefly, the invention resides in the provision of multiple turbine-generator assemblies in combination with a fluid-controlled heat load and distribution network wherein each turbine-generator assembly has a valve-controlled heat recovery unit associated with its exhaust gas outlet and positioned in heat transfer relationship to the fluid of the network. Each heat recovery unit allows for accurate control of the heat energy imparted to the network fluid so that relatively wide operating ranges are available with the overall system of the present invention. Thus, maximum heat transfer from the turbine exhaust gases can be obtained where the heat load demand is high and minimum or negligible heat transfer is obtainable where such demand is low. By utilizing a heat recovery unit for each turbine-generator installation, all of these units can be identical to minimize equipment and installation costs and to increase the reliability of the system itself. Moreover, the heat recovery units can be used either as water heaters or as boilers without requiring structural modification thereto, although the system is not limited to the use of water and steam. With this basic combination of system components a wide variety of hot water and steam systems can be developed to virtually any system operating requirement. By means of the present invention, therefore, a heat transfer fluid in a closed fluid circuit can be controllably elevated in temperature by the controlled recovery of heat energy from hot, pressurized exhaust gases, whereby the fluid can be used to satisfy predetermined heat load demands in a manner more efficiently than has been heretofore capable with conventional equipment.

Commercial and industrial energy producing installations frequently require multiples of turbine-generator sets to permit the selective operation or shutting down of the various turbines thereof as required by the electrical power demand placed on the installation. In this manner, a high load level is obtained for each turbine which enables it to operate at its best fuel rate. This approach also provides for placing one or more turbines in stand-by conditions as the power demand diminishes, all of which can be accomplished with a minimal investment in equipment.

Heat recovery from multiple turbine-generator sets has been accomplished in the past but generally a single recovery unit, such as a water heater or boiler, has been provided with the sets and combined with the fluid load and distribution system associated therewith. Such a combination requires expensive and space-consuming manifolds and ducts between the turbines and the heat recovery portion of the system and usually requires water heater or boiler designed for the specific installation. These factors reduce system reliability and increase plant and equipment costs.

The system of the present invention avoids the problems of conventional systems by providing a heat recovery unit for each turbine-generator assembly respectively. This technique permits greater control of the heat energy contained in the exhaust gases from industrial turbines and renders the energy conversion process more efficient and economical by virtue of the control to which the exhaust gases and heat transfer fluids can be subjected to satisfy system requirements.

An extremely important aspect of the invention is the manner in which electrical power generated by the turbine-generator units can be utilized in providing a source of heat for the heat load and distribution network when electrical power demand is low. Some applications have a heat load demand requiring full rated output of the heat recovery units associated therewith when reduced electrical demand has produced a part load condition on the various turbines. In the past, this requirement has been met by the combustion of additional fuel in the turbine exhaust gases or in a separate combustion chamber. This method is practical from a mechanical point of view, but is not economical in terms of fuel consumption. Because additional burner fuel is required at a time when the turbine fuel efficiency is already low due to the partial load condition, the system efficiency is severely penalized. In addition, this type of supplementary firing usually has an efficiency in the order of 70–80%; thus, 20–30% of this supplementary fuel is wasted in the exhaust gases. Also, the initial cost of the auxiliary firing equipment is generally substantial.

This invention overcomes these problems by raising the turbine-generator power output to the optimum full load condition by utilizing its power in excess of the electrical power demand to energize electrically actuated immersion heaters in a fluid receptacle forming a part of the heat load and distribution network. As additional heat is required, the power requirements of the immersion heaters raise the electrical load on the turbine-generator assembly. The heat added to the fluid in the receptacle has an efficiency of almost 100% and the increased turbine load simultaneously increases the fluid flow rate of the turbine exhaust gases to, in turn, increase the transfer of heat energy in the heat recovery units. The net effect is a sharp increase in the system efficiency because each turbine is now operating at a higher power level and at a correspondingly better fuel rate. Moreover, supplementary combustion fuel is not required.

It is, therefore, the primary object of this invention to provide improvements in commercial and industrial energy conversion systems wherein a number of turbine-generator assemblies are provided with respective valve-controlled heat recovery units for increasing the temperature and pressure of a heat transfer fluid flowing through a closed fluid circuit defining a heat load and distribution network, whereby effective control of the heat energy from the turbine exhaust gases is available to allow for more efficient and economical utilization of such heat energy as the demand therefor varies over a wide range of values.

Another object of this invention is the provision of supplementary heating means in the form of immersion heaters with the system of the type described wherein electrical power is utilized from the turbine-generator assemblies so that, during periods of relatively low electrical power demand, the output of the turbine-generator assemblies can be raised by utilizing its power to actuate the immersion heaters to, in turn, increase the fluid flow rate of the turbine exhaust gases which are required to increase the electrical load output.

Yet another object of the present invention is the provision of an energy conversion system of the aforesaid character whose heat recovery units are controlled by sensors responsive to temperature or pressure whereby the heat load demand of the system can provide the control for recovering heat energy from the turbine exhaust gases to thereby assure immediate system response to variations in heat load requirements.

A further object of the invention is the provision of energy retrieval apparatus for use with a plurality of turbine-generator assemblies wherein the apparatus includes a heat exchanger for each assembly respectively with each heat exchanger having alternate, valve-controlled fluid flow passages therethrough, not only to permit effective control of the heat transfer at all times but also to allow the heat exchanger to be used either as a water heater or as a boiler, as required.

Figure 2:
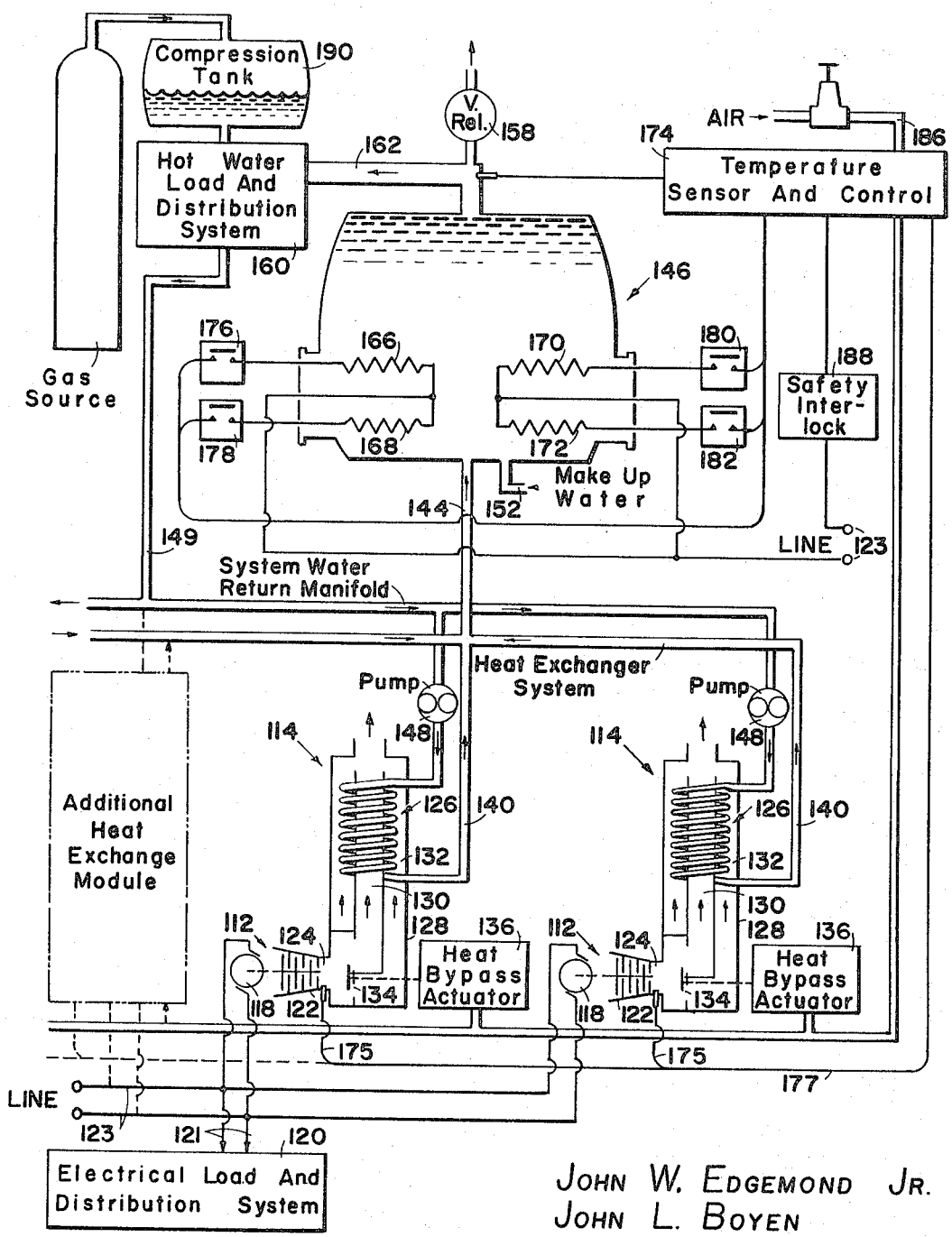

Other objects of this invention will become apparent as the specification progresses, reference being had to the accompanying drawing wherein:

FIG. 1 is a schematic view of the energy conversion system of this invention employing multiple boilers for generating a gas under pressure for use in the heat load and distribution network associated with the boilers; and FIG. 2 is a view similar to FIG. 1 but illustrating the heat recovery units used as water or other liquid heaters instead of boilers.

Energy conversion system 10 shown in FIG. 1 and utilizing a heat transfer fluid in gaseous form includes a plurality of turbine-generator assemblies 12 in combination with respective heat recovery units 14 and a heat load and distribution network 16 which is supplied with heat energy from the exhaust gases of assemblies 12 through the medium of recovery units 14. In system 10, the heat transfer fluid comprises a gas and, for purposes of illustration, this gas will be in the form of steam so that recovery units 14 will include boilers for raising a mass of water to steam at a predetermined pressure.

Each assembly 12 has an electrical power generator 18 coupled to an electrical load and distribution system 20 through suitable leads 21. Leads 23 are common to the electrical outputs of the various generators 18 and it is to be noted at this juncture that any number of assemblies 12 may be provided although only two of such assemblies are shown in FIG. 1.

Each assembly 12 also includes a gas actuated turbine 22 in coupled relationship with a corresponding generator 18, each turbine adapted to receive a flow of hot, pressurized gases therethrough for operating the same. The fluid outlet of each turbine 22 is coupled to the fluid inlet 24 of a respective recovery unit 14 so that heat transfer structure 26 in each unit 14 can be used to extract heat energy from the turbine exhaust gases.

Each assembly 12 has a unit 14 associated therewith, each unit 14 including a heat exchanger 28 provided with a pair of alternate fluid flow passages 30 and 32 and a selectively actuatable valve 34 coupled with the inlets of passages 30 and 32 to control the flow of exhaust gases thereinto. An actuator 36 is coupled with valve 34 and operates the latter in response to a predetermined parameter such as temperature or pressure. By controlling valve 34 through actuator 36, the flow of the exhaust gases through passages 30 and 32 may be controlled, passage 30 being independent of passage 32 and thereby disposed in bypassing relationship to heat transfer structure 26. The outlets of passages 30 and 32 exhaust to the atmosphere at the upper end of exchanger 28.

Each heat transfer structure 26 has an inlet pipe 38 and an outlet pipe 40 connected to fluid outlet and inlet conduits 42 and 44 respectively of a fluid reservoir or receptacle 46 forming a steam module for network 16. An actuatable fluid pump 48 in pipe 38 draws fluid from receptacle 46 and directs the same into and through structure 26. Each pump 48 is provided with a control (not shown) which actuates the same either manually or automatically, as desired. The arrows in pipes 38 and 40 represent the directions of fluid flow therethrough.

Structures 26 provide boilers for a mass 50 of water contained in receptacle 46, there being a water inlet tube 52 to assure that mass 50 is maintained at a predetermined level by any suitable control such as a float valve or the like. The structure defining each bypass passage 30 has thermal and acoustical insulation to thermally isolate passages 30 and 32 from each other and to minimize noise due to the flow of turbine gases through passage 30.

Receptacle 46 is provided with a steam separator 54 having an inlet flange 56 to which the proximal end of conduit 44 is attached. Receptacle 46 also has control structure (not shown) including a modulating water level controller, a modulating feedwater control valve, a low water cut-off, a flow switch and associated wire ring for such structure. A steam safety valve 58 is provided adjacent to the steam outlet 60 of receptacle 46 for purposes of safety. Pump 48 provides recirculating means for receptacle 46 wherein water is continuously circulated preferably at a rate equal to 4 to 5 times the maximum evaporation rate. This assures high coefficients of heat transfer, eliminates dry spots in conduits 42 and 40 and reduces the possibility of scale formation.

It is clear that heat recovery units 14 are connected in parallel with respect to each other and a single steam module such as receptacle 46 is sufficient when units 14 are so connected. It is more economical to use a single steam module sized in accordance with the number of heat recovery units 14 that are required for a particular installation. This results in simplified control because only one set of controls is required for the installation. A recirculating pump 48 is provided for each unit 14 to assure equal water distribution to the various heat transfer structures 26 and to provide maximum reliability. All other water controls are common, requiring only a single set for the entire installation. Units 14 are valved so that any one or a combination of the same may be isolated from receptacle 46 as desired or required.

Receptacle 46 is coupled to a steam load and distribution system 60 by a conduit 62 and the condensate from system 60 is returned to receptacle 46 by a conduit 64.

Supplementary heating means is provided within the mass of water within receptacle 46 and includes a number of electrical resistance immersion heaters 66, 68, 70 and 72 connected in parallel with each other and to the electrical power line defined by leads 23. A pressure sensor 74 is coupled in conduit 62 and, in turn, is connected to pressure sensitive switches 76, 78, 80 and 82 which are connected in series with heaters 66, 68, 70 and 72 respectively. A fluid conduit 84 interconnects switches 76-82 with sensor 74 and these switches are all actuated at different pressures. Thus, heaters 66-72 are successively actuated in response to a progressive decrease in the pressure of the fluid in conduit 62. Since steam pressure provides a measure of its heat transfer characteristics heaters 66-72 will provide additional heat to vaporize the water of mass 50 as the heat load demand increases.

Heaters 66-72 are called upon for additional heat when turbines 22 are operating under partial load conditions. Since the heaters are activated by the electrical power supplied by generator 18, a demand for such electrical power raises the electrical load on the turbine generator assemblies to, in turn, increase the fluid flow rate of the turbine exhaust gases. This results in an increase of the heat absorption rate of structures 26, with the net effect being a sharp rise in system efficiency because the turbine is now operating at a higher power level and a correspondingly better fuel rate.

Sensor 74 actuates switches 76-82 in any suitable manner. However, it may be pneumatically actuated by connecting the same through a pipe 86 to a source of air under pressure. Moreover, sensor 74 may be operably coupled to a fluid flow line 88 and to the various actuators 36 which control respective valves 34. These valves have a rotatable vane which controls the flow of turbine gases into passages 30 and 32. Each valve is constructed to allow for complete or partial bypass of the corresponding heat transfer structure 26 or, under heavy heat load conditions, may direct the entire volume of turbine gases into passage 32 and thereby into heat exchange relationship wtih structure 26.

In operation, system 10 normally has its heat recovery units 14 operating simultaneously to convert the heat energy of the turbine gases to heat energy in the heat transfer fluid of network 16. For this particular application, water circulating through the coils of structures 26 is vaporized and directed as steam into receptacle 46 for supplying system 60 through conduit 62. Generators 18 supply the electrical power for load 20 according to its demand, and as this demand diminishes, generators 18 are selectively shut down to maintain the relatively high efficiency of system 10.

During the minimum demands of circuit 20, system 60 may be called upon to provide additional heat to its load. This increased demand for heat will be sensed by sensor 74, which in turn will actuate heaters 66–72 through respective switches 76–82. These switches are operated by a pneumatic signal progressing through conduit 84, the signal being at a pressure level in the range, for instance, between 5 and 15 p.s.i. As the electrical power demand increases, turbines 22 are driven toward their full rated load conditions which, in turn, cause increase in the volume rate of flow of turbine exhaust gases and an increase in the heat transfer through the gas and water in structures 26. This diminishes the need for heat supplied by heaters 66–72.

To prevent the heaters from being actuated when the turbines are carrying a full electrical load, safety interlock switches 88 can be used in the circuits containing the heaters. Maximum load conditions are sensed by temperature sensors in the outlets of respective turbines 22. This is feasible because the exhaust gas temperatures bear a direct relationship to the electrical power load of each assembly 12. These gas temperature sensors are coupled to switches 88 through sensor 74 as shown by lines 75 and 77. This limiting control need not be a shut-off device by preferably an overriding step control which will sequentially deactivate the heaters as the gas temperature decreases beyond the predetermined level. This measure will protect each generator 18 against overload.

Actuators 36 are coupled pneumatically to sensor 74 so that valves 34 can be controlled and changed in response to the heat load demands of system 60 as determined by sensor 74.

FIG. 2 illustrates an installation using heat recovery units 114 as water heaters rather than as boilers as discussed above with respect to units 14. Units 14 are employed with respective generators 118 and turbines 122 of assemblies 112, generators 118 being coupled to an electrical load and distribution circuit 120 and leads 121 being coupled to a line defined by leads 123. The exhaust of turbines 122 passes into respective heat exchangers 128, each having a valve 134 controlled by an actuator 136. Each valve 134 controls gas flow through respective passages 130 and 132 so that the gases will either bypass or move into heat exchange relationship with corresponding heat transfer structure 126.

A fluid reservoir or receptacle 146 is coupled by a conduit 144 to the outlet pipes 140 of structures 126 and recirculating pumps 148 draw water into respective structures 126 through conduit 149 from a hot water load and distribution system 160 coupled to receptacle 146 by a conduit 162. A number of heaters 166, 168, 170 and 172 are connected through respective temperature sensitive switches 176, 178, 180 and 182 to a temperature sensor 174 coupled with conduit 162 to sense the water temperature thereof. Sensor 174 operates from a source of air under pressure by means of a pipe 186 and heaters 166–172 are energized by electrical power supplied by leads 123 coupled to generators 118. Safety interlock switches 188 are provided to deactivate the heaters when full electrical load conditions exist as sensed by turbine gas temperature sensors disposed in the turbine outlets and coupled by lines 175 and 177 to switches 188 through sensor 174.

A compression unit 190 is coupled with system 160 to maintain a predetermined water pressure in the closed fluid circuit thereof. A relief valve 158 is coupled in this closed fluid circuit for safety purposes. Make-up water is added to receptacle 146 by a pipe 152 adapted to be coupled by a suitable control valve to a water source.

In operation, units 114 are simultaneously in operation with their respective assemblies 112 as load conditions require. As electrical load requirements decrease, the exhaust gas output of turbines 122 also decrease. Thus, any heat load demand can be supplied by the successive continuation of heaters 166–172 in response to the sensing action of sensor 174. Since heaters 166–172 are coupled to the electrical power outputs of generators 118, an increase in the heat demand will not only actuate the heaters but increase the volume rate of flow of turbine gases so that the system will increase in efficiency because the turbines again are operating at higher power levels and at correspondingly better fuel rates.

Sensor 174 also controls actuators 136 so that changes in heat load can be reflected in changes in the operating conditions of valves 134.

By actuating these valves, the heat energy imparted to the water within structures 126 can be effectively controlled to assure that the water temperature in the closed fluid circuit containing system 160 will be maintained at a predetermined level.

The present invention, whether it uses the heat recovery unit as water heaters or as boilers, is highly reliable and efficient and has inherent safety features by virtue of the control of the turbine gas heat energy as provided by the various heat exchangers. The heat recovery units are all substantially identical in construction so that it is possible to reduce initial equipment cost to lower the installation costs and to increase the system reliability.

While several embodiments of this invention have been shown and described, it will be apparent that other adaptations and modifications can be made without departing from the true spirit and scope of the invention.

What is claimed is:

1. Energy conversion apparatus comprising: closed fluid flow circuitry having a fluid load and distribution system, a receptacle for supplying said system with fluid at an elevated temperature, and a number of heat transfer units disposed for heating the fluid before it enters the receptacle; a turbine-generator assembly for each heat transfer unit respectively, each assembly having a fluid outlet for the exhaust of heated gases therefrom and an electrical power output; an electrical load and distribution circuit coupled with the power outputs of said assemblies; means defining a fluid passage between the fluid outlet of each assembly and its corresponding heat transfer unit, whereby heated gases from the assembly may be directed into heat exchange relationship with its heat transfer unit to thereby heat the fluid flowing therethrough; and electrical heating means coupled with said electrical circuit and disposed within said receptacle and in heat exchange relationship to the fluid therewithin for heating said fluid in response to a predetermined condition of the fluid as it flows to said structure from said receptacle.

2. Energy conversion apparatus as set forth in claim 1, wherein is included means coupled with the outlet of each assembly for controlling the flow of gases to the corresponding heat transfer unit.

3. Energy conversion apparatus as set forth in claim 1, wherein said passage defining means includes a first passage in heat exchange relationship to the corresponding heat transfer unit and a second passage in bypassing relationship to the last-mentioned unit, and a valve coupled with the inlets of said passages for selectively controlling the flow of gases thereinto.

4. Energy conversion apparatus as set forth in claim 1, wherein is provided valve structure for controlling the flow of fluid through each heat transfer unit, whereby the unit may be removed from fluid-coupled relationship with said receptacle.

5. Energy conversion apparatus as set forth in claim 1, wherein is provided a fluid pump for each heat transfer unit respectively, each pump being coupled in said fluid circuitry and disposed to circulate the fluid through its heat transfer unit and said receptacle.

6. Energy conversion apparatus as set forth in claim 1, wherein said heating means includes a number of electrically actuated immersion heaters, and control means coupling the heaters with said electrical line for successively actuating the heaters in response to a progressive increase in the heat demand of said system.

7. Energy conversion apparatus as set forth in claim 1, wherein said fluid in said circuitry includes a gas, each heat transfer unit comprising a boiler.

8. Energy conversion apparatus as set forth in claim 1, wherein the fluid in said circuitry includes a liquid, each heat transfer unit comprising a liquid heater.

9. Energy conversion apparatus as set forth in claim 1, wherein said heating means includes a number of electrically actuated immersion heaters arranged in electrical parallelism with each other, and a sensor coupled to said fluid circuitry and being responsive to a parameter of the fluid flowing between said receptacle and said system to successively actuate the heaters as the heat demand of said system progressively changes.

10. A system for supplying and converting energy in different forms comprising: a number of turbine-generator assemblies, each assembly having a discharge outlet for the exhaustion of heated, pressurized gases therefrom and an electrical power output generated by the flow of gases therethrough; an electrical load and distribution circuit coupled with the power outputs of said assemblies; a heat recovery unit for each assembly respectively, each unit including a fluid passage coupled with the discharge outlet of the respective assembly and heat transfer structure in said passage in heat exchange relationship to the gases flowing therethrough; means between each assembly and its corresponding recovery unit for controlling the flow of gases therebetween; fluid flow circuitry including a fluid receptacle, a fluid load and distribution system for receiving heated fluid from the receptacle, the heat transfer structures of said recovery units being coupled with a portion of said fluid circuitry to provide a closed path for the flow of fluid through said receptacle, whereby fluid heated in said heat transfer structures can be directed into said receptacle; and electrical heating means within said receptacle and coupled with said electrical circuit for heating the fluid in the receptacle in response to a predetermined condition of the fluid as it flows to said load and distribution system from said receptacle.

11. A system as set forth in claim 10, wherein said heat transfer structures are disposed in parallelism with each other in said portion of said fluid circuitry.

12. A system as set forth in claim 10, wherein each recovery unit is provided with a second passage in by-passing relationship to the heat transfer structure thereof, said control means for each assembly including a selectively actuatable valve coupled with said passages for controlling the flow of gases therethrough.

13. A system as set forth in claim 10, wherein said fluid in said fluid circuitry comprises a liquid, said electrical heating means including an immersion heater, and a temperature sensor in said fluid circuit and coupled with the heater for actuating the same in response to a predetermined temperature of the liquid flowing from said receptacle to said system.

14. A system as set forth in claim 10, wherein the fluid in said fluid circuitry includes a gas, said electrical heating means including an immersion heater and a sensor responsive to the gas pressure in said fluid circuit, said sensor being coupled with the heater for actuating the same when a predetermined fluid pressure is attained in said fluid circuitry.

No references cited.

MARTIN P. SCHWADRON, *Primary Examiner.*
ROBERT R. BUNEVICH, *Examiner.*